United States Patent
Anner et al.

[11] 3,818,075
[45] June 18, 1974

[54] 3—OXO—A—NOR—B—HOMO—OESTRA—5(10),6—DIENES

[75] Inventors: Georg Anner; Jaroslav Kalvoda, both of Basel, Switzerland

[73] Assignee: Ciba-Geigy Corporation, Ardsley, N.Y.

[22] Filed: July 19, 1972

[21] Appl. No.: 273,073

[30] Foreign Application Priority Data
July 22, 1971  Switzerland...................... 10889/71

[52] U.S. Cl........ 260/488 B, 260/340.9, 260/345.9, 260/347.5, 260/347.8, 260/410, 260/463, 260/468 R, 260/476 C, 260/487, 260/491, 260/586 H, 260/999

[51] Int. Cl............................................. C07c 171/06

[58] Field of Search......... 260/340.9, 488 B, 586 H, 260/491, 468 R, 476 C, 410, 345.9, 347.5, 347.8

[56] References Cited
UNITED STATES PATENTS

| | | | |
|---|---|---|---|
| 3,504,003 | 3/1970 | Jeger et al. | 260/410 |
| 3,642,826 | 2/1972 | Anner et al. | 260/340.9 |

*Primary Examiner*—Vivian Garner
*Attorney, Agent, or Firm*—Joseph G. Kolodny

[57] ABSTRACT

The invention provides for compounds of the formula

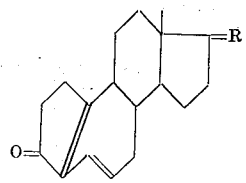

wherein R is free or ketalised oxo, a free, esterified or etherified hydroxy group in β-position together with a hydrogen atom or a lower aliphatic hydrocarbon radical, for example, the 3,17-dioxo-A-nor-B-homo-oestra-5(10),6-diene or the 3-oxo-17β-hydroxy-17α-ethinyl-A-nor-B-homo-oestra-5(10),6-diene.

Use: as antiandrogens or as intermediates.

They may be prepared by treating a 3,10-dioxo-17-R-5,10-seco-androsta-5-ene or its tautomers with strong bases.

15 Claims, No Drawings

3—OXO—A—NOR—B—HOMO—OESTRA—5(10),6—DIENES

The subject of the invention are new 3-oxo-A-nor-B-homo-oestra-5(10),6-dienes of the general formula

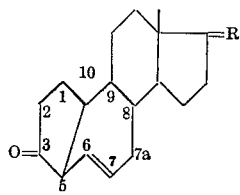

wherein R denotes a free or ketalised oxo group or a free, esterified or etherified hydroxyl group, in the β-configuration, together with a hydrogen atom or a lower aliphatic, saturated or unsaturated hydrocarbon radical, and a process for their manufacture.

An esterified hydroxyl group is, in particular, a hydroxyl group which is esterified with an aliphatic, alicyclic, araliphatic or aromatic carboxylic acid with at most 20 carbon atoms, for example with methylcarbonic, decanoic, undecylenic, hexahydrobenzoic, cyclopentylpropionic, phenyl-propionic, benzoic or furanecarboxylic acid, above all with a lower aliphatic carboxylic acid, for example with formic, acetic, trifluoroacetic, trimethylacetic, propionic or caproic acid. An etherified hydroxyl group is especially a hydroxyl group which is etherified with aliphatic, cycloaliphatic, araliphatic or heterocyclic alcohols, such as lower alkanols, for example methanol or ethanol, cycloalkanols, for example cyclopentanol or cyclohexanol, or Ar-lower alkanols, such as benzyl alcohol, or with tetrahydrofuranyl alcohols or tetra-hydropyranyl alcohols.

Possible lower saturated or unsaturated aliphatic radicals are, for example, lower alkyl radicals, such as methyl, ethyl, propyl or isopropyl radicals, lower alkenyl radicals, such as vinyl, allyl or methallyl radicals, or lower alkinyl radicals, such as ethinyl or propinyl radicals. The term "lower" used above or in the following text in connection with hydrocarbon radicals defines those radicals which have at most five chain carbon atoms.

The new compounds are distinguished by an anti-androgenic, especially a local anti-androgenic, action. Thus, for example, 3-oxo-17-hydroxy-A-nor-B-homo-oestra-5(10),6-diene shows a pronounced action in the comb growth inhibition test when administered locally, at 0.03 mg/kg [$ED_{50}$], whilst the corresponding 17 ketone does so at 0.07 mg/kg [$ED_{50}$]. They can be used as local anti-androgens, for example, for the local treatment, especially of skin diseases which are attributable to over-production of androgens. On the other hand, they are also valuable intermediate products for the manufacture of other A-nor-B-homo-androstenes according to known chemical and/or micro-biological methods, especially for the manufacture of the corresponding compounds without the double bond in the 6,7-position, for example, by selective hydrogenation of this double bond with hydrogen in the presence of, for example, palladium on charcoal or palladium on calcium carbonate, or for the manufacture of the highly active 3-oxo-6-hydroxy-$\Delta^5$-19,A-bis-nor-B-homo compounds, for example, by epoxidation of the 6,7-double bond with a per-acid, subsequent isomerisation with acids, especially a Lewis acid, for example, boron trifluoride, and hydrogenation of the $\Delta^{5(10)}$ double bond with catalytically activated hydrogen.

The compounds of the above formula wherein R represents a free keto group or a hydroxyl group together with a hydrogen atom or a methyl or ethinyl group, and their esters with aliphatic, especially lower aliphatic, carboxylic acids, such as those mentioned above, above all their acetates, are particularly valuable.

The new 3-oxo-A-nor-B-homo-oestra-5(10),6-dienes are obtained if a 3,10-dioxo-5,10-seco-oestr-5-ene of the general formula

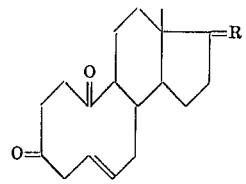

wherein R has the initially mentioned meaning, or its tautomers, are reacted with strong bases and, if desired, in resulting compounds a ketalised oxo group which is present is liberated and/or esterified or etherified hydroxyl groups are hydrolysed and/or a 17-oxo group which is present is reduced, optionally with the introduction of a lower aliphatic, saturated or unsaturated hydrocarbon radical, and/or a free hydroxyl group present in resulting compounds is esterified or etherified.

The strong base used can be any strong inorganic base, such as an alkali hydroxide, for example, sodium hydroxide, potassium hydroxide or lithium hydroxide, or an alkali alcoholate, for example, potassium t-butylate or sodium methylate or ethylate, or strong organic bases, such as an open-chain or cyclised tertiary or secondary amine, for example, trimethylamine, triethylamine or piperidine.

In the process products present it is possible, if desired, to split esterified or etherified hydroxyl groups or ketalised oxo groups, which are present, by hydrolysis. A free oxo group in the 17 position can be reduced selectively to the 17 hydroxy group by reduction with, for example, a complex light metal hydride, especially an alkali metal borohydride or lithium tri-tert-butoxy-aluminium hydride. It can, however, also be reduced by means of a metal derivative, especially a Grignard compound or an alkali metal derivative, such as a lithium derivative or sodium derivative, of a lower aliphatic compound to give 17β-hydroxy compounds which are 17α-substituted. A free hydroxyl group can be esterified or etherified in the usual manner, especially with the abovementioned acids, their anhydrides or halides or the alcohols mentioned.

The starting substances to be used according to the invention are known or can be obtained according to methods which are in themselves known, for example, by fragmentation, with evolution of nitrogen, of 6-tosylhydrazones of 6-oxo-5,10-epoxy-oestranes, reduction of the 5,6-triple bond thus produced and liberation of a possibly protected oxo group in the three position.

The invention also relates to those embodiments of the process in which a starting substance is formed under the reaction conditions or is used in the form of a salt or other derivatives, or in which a compound obtainable as an intermediate product at any stage is used as the starting material and the missing steps are carried out.

The new compounds can be used, for example, in the form of pharmaceutical preparations in which they are present in the free form, mixed with a pharmaceutical, organic or inorganic, solid or liquid excipient suitable for enteral or parenteral, especially local, administration. Possible substances for forming the excipient are those which do not react with the new compounds, such as, for example, water, gelatine, lactose, starch, stearyl alcohol, magnesium stearate, talc, vegetable oils, benzyl alcohols, gum, propylene glycols, white petroleum jelly or other known medicinal excipients. The pharmaceutical preparations can be, for example, in the form of tablets, dragees or capsules or in a liquid form as a solution or suspensions or emulsions, such as ointments, creams or lotions. If desired, they are sterilised and/or contain auxiliaries, such as preservatives, stabilisers, wetting agents or emulsifiers, solubilising agents or salts for regulating the osmotic pressure or buffers. They can also contain other therapeutically valuable substances. The pharmaceutical preparations are formulated in accordance with customary methods.

The new compounds can also be used in the form of feedstuffs or of additives to animal fodder. Here, for example, the customary extenders and diluents and/or feedstuffs are used.

The examples which follow explain the invention without however limiting it in any respect.

EXAMPLE 1

4.6 g of 3,10,17-trioxo-5,10-seco-oestr-5-ene are dissolved in 150 ml of methyl alcohol and after adding 2.3 g of potassium t-butylate the mixture is stirred for 1 hour under nitrogen at room temperature. 3.5 ml of glacial acetic acid are added to the reaction mixture, which is poured into ice-water and twice extracted with chloroform. The organic solutions are successively washed with ice-cold sodium bicarbonate solution and with water, dried and evaporated in a water pump vacuum. The crude product obtained in the form of yellowish crystals is purified by chromatography on silica gel. Elution with toluene-ethyl acetate (95:5) mixture yields 3,17-dioxo-A-nor-B-homo-oestra-5(10),6-diene, which after recrystallisation from methylene chloride-/acetone melts at 185°–186°C. $[\alpha]_D^{20} = +271°$(c = 0.956 − CHCl$_3$).

The triketone used as the starting material can, for example, be manufactured as follows: 8.6 g of 3,3,17,17-bis-ethylenedioxy-10-oxo-5,10-seco-oestr-5-ine are hydrogenated in 1,300 ml of ethanol, with 1.7 g of 10 percent strength palladium on calcium carbonate as the catalyst, until 1 mol of hydrogen (515 ml) has been taken up. 6.7 g of pure hydrogenation product (3,3,17,-17-bis-ethylenedioxy-10-oxo-5,10-seco-oestr-5-ene) of melting point 173°–174°C, obtained by working up and subsequent recrystallisation from methylene chloride/ether/petroleum ether, are dissolved in 140 ml of hot glacial acetic acid and after adding 140 ml of water the mixture is warmed to 90°C for 90 minutes, whilst stirring. The reaction mixture is poured into ice water and twice extracted with chloroform. The organic constituents are washed with sodium bicarbonate solution and with water until neutral, dried and evaporated in a water pump vacuum. The pure 3,10,17-trioxo-5,10-seco-oestr-5-ene melting at 157°–158°C is obtained by recrystallisation of the crude product obtained from methylene chloride/ether/petroleum ether.

EXAMPLE 2

A solution of 1.3 ml of 3,17-dioxo-A-nor-B-homo-oestra-5(10),6-diene in 20 ml of tetrahydrofurane is added dropwise over the course of 3 minutes to a suspension of 3.5 g of lithium tri-t-butoxy-aluminium-hydride in 35 ml of absolute tetrahydrofurane. The reaction mixture is subsequently stirred for 2 hours at room temperature and then poured into an ice-cold solution of 4.5 g of ammonium sulphate, the mixture is twice extracted with ether/methylene chloride, and the organic constituents are successively washed with 2 N hydrochloric acid, water, sodium bicarbonate solution and water, dried and evaporated in a water pump vacuum. The resulting crystalline crude product is subsequently chromatographed on silica gel. Using toluene-ethyl acetate (90:10) mixture, the pure 3-oxo-17$\beta$-hydroxy-A-nor-B-homo-oestra-5(10),6-diene, which after recrystallisation from methylene chloride-ether melts at 187°–189°C, is obtained.

EXAMPLE 3

1.0 g of 3-oxo-17$\beta$-hydroxy-A-nor-B-homo-oestra-5(10),6-diene is dissolved in 5 ml of pyridine, 5 ml of acetic anhydride are added and the mixture is left to stand for 18 hours at room temperature. The reaction mixture is poured into ice-water, the whole is stirred for 15 minutes and twice extracted with methylene chloride/ether mixture, and the extracts are washed with 2 N hydrochloric acid, water, sodium bicarbonate solution and again with water, dried and evaporated in a water pump vacuum. Recrystallisation of the crude product from ether yields the pure 3-oxo-17$\beta$-acetoxy-A-nor-B-homo-oestra-5(10),6-diene. UV-spectrum: 213nm/16,200; 274/5,900.

EXAMPLE 4

A solution of 1.98 g of 3,10-dioxo-17$\alpha$-methyl-17$\beta$-hydroxy-5,10-seco-oestr-5-ene in 30 ml of anhydrous methanol is treated with 850 mg of potassium t-butylate and stirred for 3 hours at room temperature under nitrogen. Thereafter 1.3 ml of glacial acetic acid are added to the yellow-brown reaction mixture which is poured into ice-water, the mixture is twice extracted with ether-methylene chloride (4:1) mixture, and the organic constituents are washed with sodium bicarbonate solution and with water until neutral, dried and evaporated in a water pump vacuum. Chromatography of the crude product on silica gel yields the pure 3-oxo-17$\alpha$-methyl-17$\beta$-hydroxy-A-nor-B-homo-oestra-5(10),6-diene melting at 174°–175°C.

The diketone used as the starting product can be obtained, for example, as follows: 1.28 g of 3,3,17,17-bis-ethylenedioxy-10-oxo-5,10-seco-oestr-5-ene are dissolved in 20 ml of tetrahydrofurane and the solution is added dropwise to a suspension of 640 mg of lithium aluminium hydride in 20 ml of tetrahydrofurane. The reaction mixture is stirred for 2 hours at room temperature and then cooled to approx. 5°C, the excess reducing agent is decomposed by careful dropwise addition of a solution of 1.3 ml of water in 15 ml of tetrahydrofurane, 15 g of sodium sulphate are added, inorganic constituents are filtered off and the filtrate is evaporated in a water pump vacuum. 1.05 g of the reduction product (3,3,17,17-bis-ethylenedioxy-10- hydroxy-5,10-seco-oestr-5-ene) obtained by crystallisation from methylene chloride/ether are acetylated in the usual manner in a mixture of 5 ml of pyridine and 5 ml of acetic anhydride. 24.5 g of a 10-acetoxy compound thus obtained are dissolved in 530 ml of glacial acetic acid and after adding 200 ml of water the mixture is stirred for 90 minutes at room temperature. It is poured into water and extracted with ether-methylene chloride (4:1) mixture, and the organic constituents are washed with 2 N sodium hydroxide solution and with water until neutral, dried and evaporated in a water pump vacuum. The 3,3-ethylenedioxy-10-acetoxy-17-oxo-5,10-seco-oestr-5-ene (8.6 g) which has been purified by crystallisation and melts at 146°–148°C is dissolved in a mixture of 200 ml of tetrahydrofurane and 340 ml of absolute ether and the solution is added dropwise to a methylmagnesium iodide solution prepared from 15.5 g of magnesium filings and 55 ml of methyl iodide in 340 ml of ether. The reaction mixture is boiled for 5 hours under reflux and then cooled to approx. 10°C, 450 ml of a saturated ammonium chloride solution are then added dropwise whilst cooling and stirring, the mixture is poured into ice-water and twice extracted with chloroform, and the extracts are successively washed with 2 N hydrochloric acid, water, saturated sodium bicarbonate solution and water, dried and evaporated in a water pump vacuum. Crystallisation of the crude product from methylene chloride/ether yields the pure 3,3-ethylenedioxy-10,17β-dihydroxy-17α-methyl-5,10-seco-oestr-5-ene melting at 199°–201°C. 5.46 g of this compound are dissolved in 50 ml of pyridine and added to an oxidation mixture prepared from 5.46 g of chromic acid and 160 ml of pyridine. The reaction mixture is left to stand for 17 hours at room temperature, ethyl acetate is added, insoluble chromium compounds are filtered off, the filtrate is evaporated in a water pump vacuum and the evaporation residue, dissolved in methylene chloride, is then filtered through a 10-fold amount by weight of basic aluminium oxide (activity II). Crystallisation of the crude product thus obtained from methylene chloride/ether yields the pure 3,3-ethylenedioxy-10-oxo-17α-methyl-17β-hydroxy-5,10-seco-oestr-5-ene melting at 147°–148°C. A hot solution of this compound (3.8 g) in 80 ml of glacial acetic acid is treated with 80 ml of water and warmed to 90°C for 90 minutes. The reaction product is then poured into water and twice extracted with chloroform, and the organic constituents are washed with sodium bicarbonate solution and with water until neutral, dried and evaporated in a water pump vacuum. The pure 3,10-dioxo-17α-methyl-17β-hydroxy-5,10-seco-oestr-5-ene obtained by crystallisation of the crude product obtained melts at 103°C.

Analogously, 3-oxo-17α-ethinyl-17β-hydroxy-A-nor-B-homo-oestra-5(10),6-diene can be obtained from 3,-10-dioxo-17α-ethinyl-17β-hydroxy-5,10-seco-oestr-5-ene.

The starting material is obtained from the 3,3-ethylenedioxy-10-acetoxy-17-oxo-5,10-seco-oestr-5-ene described above by ethinylation with lithium acetylide in the usual manner.

EXAMPLE 5

1.0 g of 3-oxo-17β-hydroxy-A-nor-B-homo-oestra-5(10),6-diene are dissolved in 20 ml of dioxane, 400 mg of a 50 percent strength sodium hydride suspension in oil are added, the mixture is stirred for 1 hour under nitrogen and after adding 1.5 ml of cyclopentyl bromide the whole is boiled for 18 hours under reflux. The reaction mixture is cooled and carefully poured into ice water whilst vigorously stirring, the mixture is extracted with ether, and the organic layer is washed with water until neutral, dried and evaporated in a water pump vacuum. The resulting crude product is dissolved in toluene and chromatographed on silica gel. Pure 3-oxo-17β-cyclo-pentyl-A-nor-B-homo-oestra-5(10),6-diene is thus obtained.

EXAMPLE 6

540 mg of pure 3,17-dioxo-A-nor-B-homo-oestra-5(10),6-diene are dissolved in 50 ml of ethanol and hydrogenated with 100 mg of 10 percent strength palladium on calcium carbonate, as the catalyst, until 1 mol of hydrogen (45 ml) has been taken up. The reaction mixture is freed of the catalyst by filtration and the filtrate is evaporated in a water pump vacuum. Recrystallisation of the crude product from methylene chloride/ether yields the pure 3,17-dioxo-A-nor-B-homo-oestr-5(10)-ene melting at 108°–109°C.

EXAMPLE 7

A solution of 1.08 g of 3-oxo-17β-acetoxy-A-nor-B-homo-oestr-5(10),6-diene is treated with 800 mg of m-chloro-perbenzoic acid and left to stand for 18 hours at approx. 5°C. The usual working up yields 1.1 g of crude 3-oxo-17β-hydroxy-6,7-oxido-A-nor-B-homo-oestr-5(10)-ene, which, without purification, is dissolved in 100 ml of ether; 0.5 ml of boron trifluoride-etherate are added and the whole is left to stand for 2 hours at room temperature. The reaction mixture is poured into ice water and the organic layer is washed with sodium bicarbonate solution and with water, dried and evaporated in a water pump vacuum. The resulting crude product, 3,6-dioxo-17β-acetoxy-A-nor-B-homo-oestr-5(10)-ene, after subsequent reduction of the 5(10)-double bond with potassium borohydride in methanol/-glacial acetic acid, and chromatographic purification, yields 3,6-dioxo-17β-acetoxy-A-nor-B-homo-oestrane of melting point 165°C. UV-spectrum (ethanol): $\lambda_{max}$ 2-89 μm ( = 9,500).

We claim:

1. Process for the manufacture of new 3-oxo-A-nor-B-homo-oestra-5(10),6-dienes, characterised in that a 3,10-dioxo-5,10-seco-oestr-5-ene of the general formula

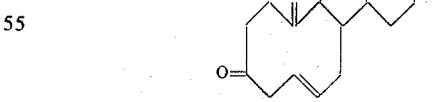

wherein R denotes a free or ketalised oxo group or a free, esterified or etherified hydroxyl group, in the β-configuration, together with a hydrogen atom or a lower aliphatic, saturated or unsaturated hydrocarbon, or its tautomers, are reacted with a strong base to produce the corresponding 3-oxo-A-nor-B-homo-oestra-5(10),6-diene, each of said esterified hydroxyl groups being derived from a hydrocarbon carboxylic acid having up to 20 carbon atoms and each of said etherified hydroxyl groups being derived from a lower alkanol, a cycloalkanol having five to six ring carbon atoms, a phenyl-lower alkanol, a tetrahydrofuranyl or a tetrahydropyranyl alcohol.

2. Process according to claim 1, wherein an alkali metal alcoholate is used as the strong base.

3. Process according to claim 1, wherein an open chain or cyclised, tertiary or secondary amine is used as the strong base.

4. Process according to claim 1, characterised in that a compound of the indicated formula, wherein R is a free or ketalised keto group or a hydroxyl group together with a hydrogen atom or a methyl or ethinyl group, is used as the starting substance.

5. Process according to claim 1, characterised in that 3,10,17-trioxo-5,10-seco-oestr-5-ene is used as the starting substance.

6. Process according to claim 1, characterised in that 3,10-dioxo-17β-hydroxy-17α-methyl-5,10-seco-oestr-5-ene is used as the starting substance.

7. 3-Oxo-A-nor-B-homo-oestra-5(10),6-dienes of the general formula

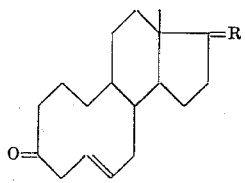

wherein R denotes a free or ketalised oxo group or a free, esterified or etherified hydroxyl group, each of said esterified hydroxyl groups being derived from a hydrocarbon carboxylic acid having up to 20 carbon atoms and each of said etherified hydroxyl groups being derived from a lower alkanol, a cycloalkanol having five to six ring carbon atoms, a phenyl-lower alkanol, a tetrahydrofuranyl or a tetrahydropyranyl alcohol, in the β-configuration, together with a hydrogen atom or a lower aliphatic, saturated or unsaturated hydrocarbon radical.

8. 3-Oxo-A-nor-B-homo-oestra-5(10),6-dienes as claimed in claim 7, wherein R represents a free keto group or a hydroxyl group, in the β-configuration, which is free or esterified with a lower aliphatic carboxylic acid or etherified with lower alkanols or cycloalkanols having five to six ring carbon atoms, together with a hydrogen atom or a lower alkyl, lower alkenyl or lower alkinyl radical.

9. 3-Oxo-A-nor-B-homo-oestra-5(10),6-dienes as claimed in claim 7, wherein R represents a free keto group or a hydroxy group, in β-configuration, together with a hydrogen atom or a methyl or ethinyl group.

10. 3-Oxo-A-nor-B-homo-oestra-5(10),6-dienes as claimed in claim 7, wherein R represents a free oxo group.

11. 3-Oxo-A-nor-B-homo-oestra-5(10),6-dienes as claimed in claim 7, wherein R represents a hydroxy group in β-position together with a hydrogen atom.

12. 3-Oxo-A-nor-B-homo-oestra-5(10),6-dienes as claimed in claim 7, wherein R represents an acetoxy group in β-position together with a hydrogen atom.

13. 3-Oxo-A-nor-B-homo-oestra-5(10),6-dienes as claimed in claim 7, wherein R represents a hydroxy group in β-position together with a methyl group.

14. 3-Oxo-A-nor-B-homo-oestra-5(10),6-dienes as claimed in claim 7, wherein R represents a hydroxy group in β-position together with an ethinyl group.

15. 3-Oxo-A-nor-B-homo-oestra-5(10),6-dienes as claimed in claim 7, wherein R represents a cyclopentyloxy group in β-position together with a hydrogen atom.

* * * * *

UNITED STATES PATENT OFFICE
CERTIFICATE OF CORRECTION

PATENT NO. : 3,818,075
DATED : June 18, 1974
INVENTOR(S) : Georg Anner et al

It is certified that error appears in the above-identified patent and that said Letters Patent are hereby corrected as shown below:

Column 7, claim 7, the lower left-hand portion of formula should read:

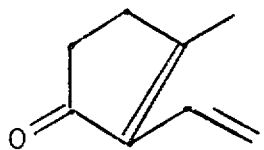

Signed and Sealed this fifth Day of August 1975

[SEAL]

Attest:

RUTH C. MASON
Attesting Officer

C. MARSHALL DANN
Commissioner of Patents and Trademarks